United States Patent [19]

Watanabe et al.

[11] Patent Number: 4,469,729
[45] Date of Patent: Sep. 4, 1984

[54] ARTICLE HAVING HARD FILM, A FLEXIBLE BODY AND A FIBER LAYER DISPOSED THEREBETWEEN

[75] Inventors: Shigetaka Watanabe; Masahiro Suzuki, both of Hitachi; Yoshiaki Matsuga, Mito, all of Japan

[73] Assignee: Hitachi Cable Ltd., Tokyo, Japan

[21] Appl. No.: 382,212

[22] Filed: May 26, 1982

[30] Foreign Application Priority Data

Jun. 11, 1981 [JP] Japan ................................. 56-90038

[51] Int. Cl.$^3$ ...................... B29H 7/22; B65G 15/32; F16G 1/06; F16G 1/14; F16L 11/08
[52] U.S. Cl. ...................................... 428/36; 138/118; 138/125; 138/126; 198/337; 198/846; 428/204; 428/212; 428/250; 428/252; 428/286; 428/334; 428/335; 428/336; 428/339; 428/908.8; 428/909; 474/260; 474/268; 474/271; D25/73
[58] Field of Search .................... 428/250, 908.8, 909, 428/36, 204, 212, 334, 335, 336, 339, 252, 286; 264/263; 156/137; 474/260, 268, 271; 198/846, 337; 138/118, 125, 126

[56] References Cited

U.S. PATENT DOCUMENTS

| | | | |
|---|---|---|---|
| 3,485,707 | 12/1969 | Spicer | 428/250 |
| 3,791,912 | 2/1974 | Allard | 428/294 |
| 3,857,751 | 12/1974 | Jacobs | 156/137 |
| 3,996,401 | 12/1976 | Van Neckel | 428/250 |
| 4,127,039 | 11/1978 | Hollaway | 152/359 |
| 4,157,101 | 6/1979 | Ross | 428/250 |
| 4,174,244 | 11/1979 | Thomas et al. | 428/250 |
| 4,184,589 | 1/1980 | Habegger et al. | 156/137 |
| 4,224,370 | 9/1980 | Heinemann | 428/250 |
| 4,331,500 | 5/1982 | Gersbeck et al. | 156/137 |

*Primary Examiner*—James C. Cannon
*Attorney, Agent, or Firm*—Frishauf, Holtz, Goodman & Woodward

[57] ABSTRACT

This invention relates to a flexible article comprising rubberlike body having a surface hard film, e.g., a hose, a handrail, a belt or a diaphragm, wherein a fiber layer comprising non-woven or woven fabrics is positioned between the surface hard film and the rubberlike body by use of an adhesive to eliminate generation of the so-called joint cracking phenomenon, i.e., extension of cracking to the rubberlike body accompanying cracking at the hard film caused by any shock.

24 Claims, 8 Drawing Figures

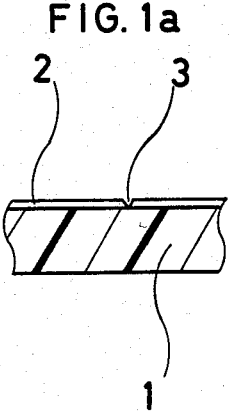
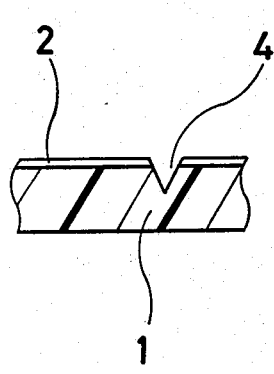
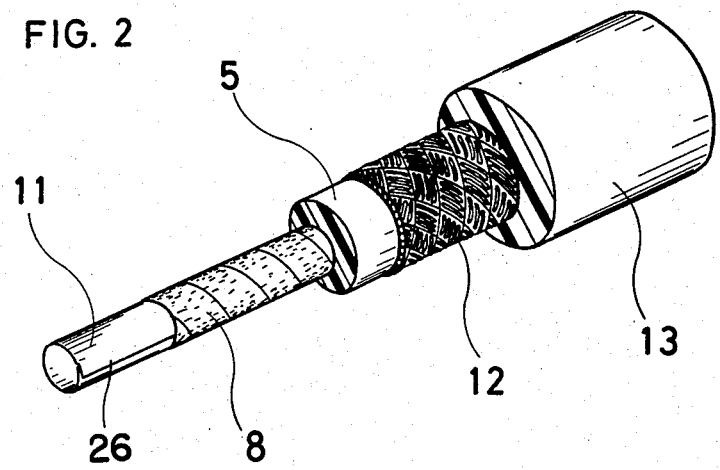
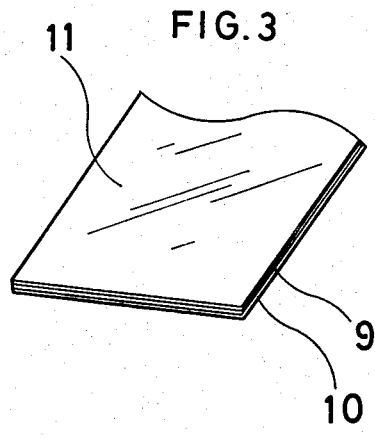
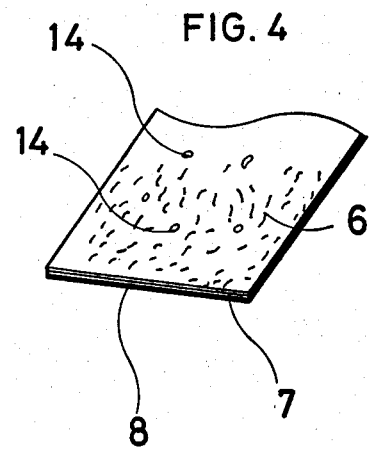

ARTICLE HAVING HARD FILM, A FLEXIBLE BODY AND A FIBER LAYER DISPOSED THEREBETWEEN

BACKGROUND OF THE INVENTION

1. Field of the Invention

This invention relates to the structure of a flexible article comprising a rubberlike flexible body having a hard film on the surface thereof such as, for example, a hose, a handrail a belt or a diaphragm, improvements in eliminating the undesirable phenomenon of "joint cracking", i.e., the development or propagation of cracks into the rubberlike body when the hard surface film is cracked for an impact.

2. Description of the Prior Art

In order to improve the wear resistance, reduction in friction factor and barrier effect against liquids (such as gasoline, light oil, alcohol-mixed gasoline), and gases (such as natural gas, liquefied petroleum gas, Freon gas) of soft rubber articles including fluidtransporting hoses, handrail bodies for use in escalators and automatic lines, and belt bodies for use in various machines, the surface of the rubber articles is conventionally hardened by ebonite formation, lining with cured films and painting while maintaining the flexibility of the whole rubber bodies.

However, if the hardness at the surface alone is increased, "joint cracking phenomenon" which may cause problems in the rubberlike bodies. An example is shown in FIG. 1, with reference to a rubber hose for use in automobile brakes. If small crack 3 occurs as shown in FIG. 1(a) by a shock in a hard and thin surface film (plastic film) 2 provided at the inner periphery of a rubber hose body 1, it develops in a short time to a deep and big crack 4 reaching the rubberlike body as shown in FIG. 1(b) by later deformation and repetition of shock and deformation. In addition, since hard plastic films have deformation fatigue values smaller than those of soft rubber, surface fatigue cracks sometimes become the nuclei to cause joint cracking. Therefore, it was difficult to provide a cured layer at the surface alone in flexible articles including handrails and belts as well as the said rubber hose which may receive large deformation and repetition of deformation.

The flexible articles including hoses, handrails and belts are generally embellished by use of color rubber (decorative rubber) or paints at the most outer layer. However, the flexible articles of such a structure have poor embellishment endurance and cleaning resistance. In terms of embellishment endurance, color rubber which is soft and is contaminated and swells with fat and oil has poor embellishment endurance. It is also difficult with paints to maintain long the beauty of the surface because of peeling and contamination of the paint layer. Also, fatigue cracking easily occurs in the hard films. In terms of cleaning resistance, it is difficult to wash and clean rubber and paints with a strong detergent and a solvent, since they easily wear by hard rubbing with a brush and the like, loosing surface smoothness and gloss, and sometimes being affected by organic solvents and detergents. Also, if the most outer layer is a colored cloth, it easily becomes dirty and hardly cleans.

OBJECT OF THE INVENTION

This invention was accomplished on the basis of the above findings, and the object of the invention is to provide a flexible article causing no joint cracking.

SUMMARY OF THE INVENTION

The features of the invention are:

(1) The flexible article comprises a soft and flexible rubberlike body having at the surface thereof a hard, stiff and thin film comprising a plastic film or a plastic/metal complex film. and a fiber layer comprising non-woven or woven fabrics being positioned between the said surface film and the rubberlike body by use of an adhesive, (2) the flexible article comprises a soft and flexible rubberlike body having at the surface thereof a hard, stiff and thin film comprising a plastic film or a plastic/metal complex film, and a fiber tape comprising non-woven or woven fabrics which has an adhesive coated at one side being positioned between the surface hard film and the rubberlike body in such a manner that the adhesive side faces the surface hard film, (3) the flexible article comprises a soft and flexible rubberlike body having at the surface thereof a hard, stiff and thin film comprising a plastic film or a plastic/metal complex film, and a fiber layer comprising embellished non-woven or woven fabrics being positioned between the surface hard film and the rubberlike body by use of an adhesive, and (4) the flexible article comprises a soft and flexible rubberlike body having at the surface therof a hard, stiff and thin film comprising a plastic film or a plastic/metal complex film, and a fiber tape comprising embellished non-woven or woven fabrics which has an adhesive coated at one side being positioned between the surface hard film and the rubberlike body in such a manner that the adhesive side faces the surface hard film.

The surface hard film of this invention includes a plastic film and a plastic/metal complex film. In more specific, the plastic film includes polyester film (e.g., Mylar, trade name), polyamide films (e.g., Nylon, trade name), triacetate films, polycarbonate films (e.g., Panelyte, trade name), and fluororesin films. The plastic/metal complex film includes laminate films of various types of plastic films described above and metals such as aluminum, copper, tin, lead and silver. Various types of hard films mentioned above may directly be caused to adhere to the fiber layer in such a manner that: (a) the surface hard films formed in a strip or tape are caused to adhere by use of an adhesive agent, (b) a strip of laminate film comprising a plastic film and metallic foil (aluminum foil, copper foil, tin foil, lead foil or silver foil) is caused to adhere by use of an adhesive agent, (c) a strip of complex film comprising a plastic film onto which a metal such as aluminum, copper, tin, lead and silver is evaporated is caused to adhere by use of an adhesive, and (d) various types of resins and metals described above are caused to adhere to the fiber layer by coating including direct spraying.

The surface hard films should preferably have a thickness of 5–300$\mu$, because film formation is difficult at a thickness below 5$\mu$, and flexibility becomes poor at a thickness above 300$\mu$. In addition, the said hard films should preferably have a young's modulus ten times or more greater than that of the rubberlike body, because a hard film having a young's modulus close to that of the rubberlike body may easily be injured or swell with oil in a manner similar to that in the rubberlike body.

The rubberlike body of this invention includes natural rubber, synthetic rubber, and thermoplastic polymers showing rubber elasticity.

The fiber layer of this invention should preferably comprise non-woven or woven fabrics of natural and synthetic fibers, but other materials of high tear resistance such as metallic non-woven or woven fabrics and paper may also be used in eliminating joint cracking.

Suitable adhesives for joining the fiber layer to the surface hard film or the rubberlike body are rubber cement and hot-melt adhesives (powder, film or emulsion). Curing adhesives such as epoxy, urethane, and vanish adhesives are unsuitable, because they easily cause cracking if cured in the said fiber layer. However, the adhesives should not be limited to these adhesives, and those curing adhesives of lower hardness may also be used. The hot-melt adhesives include, for example, olefin adhesives (commercially available Tuffmer, Admer, Serlin, etc.) and vinylidene chloride adhesives. The olefin adhesives include, for example, polyethylene, polypropylene, ethylene/vinyl acetate copolymers, ethylene/propylene copolymers, ethylene/ethylacrylate copolymers, ethylene/methacrylate copolymers, and modified polymers thereof.

DESCRIPTION OF THE DRAWINGS

Some examples of flexible articles of this invention are illustrated below with reference to the drawings.

FIG. 1(a) and FIG. 1(b) are partially sectional views showing a part of a conventional rubber hose.

FIG. 2 is a partial cutway view in perspective embodying the invention.

FIG. 3 and FIG. 4 are principal part perspective views illustrating films to be used in FIG. 2.

DESCRIPTION OF THE PREFERRED EMBODIMENTS

Figure 5:
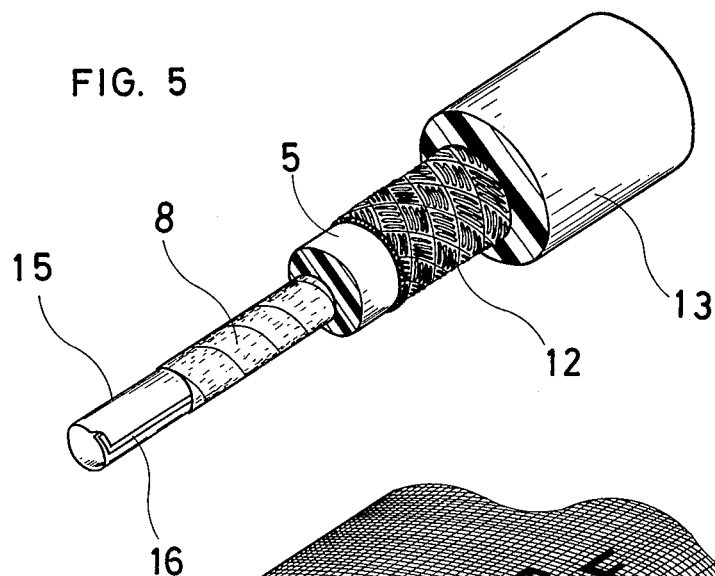
FIG. 5, FIG. 6 and FIG. 7 are partial cutway views in perspective illustrating other examples of this invention.

FIG. 2 shows a rubber hose embodying the invention. A fiber layer (fiber tape in this case) 8, which characterizes the invention and comprises a thin layer (Thickness: 30 g/m$^2$) of non-woven Tetoron fabric 6 and a hot-melt adhesive layer (30$\mu$ thick) laminated on one side thereof, as shown in FIG. 4 is arranged by lapping in a spiral pipe form at the inner periphery of a thick rubber hose body 5 comprising natural rubber, synthetic rubber, etc. with the non-woven fabric 6 outside (i.e., at the larger diameter side). A Mylar film (16$\mu$ thick) comprising a hard, stiff and thin polyester resin onto which aluminum 9 (7$\mu$ thick) and a hot-melt film (30$\mu$ thick) 10 is laminated is arranged by lapping longitudinally with a lapped section 26 as a surface hard film at the inner side (smaller diameter side) of the fiber layer 8. A net reinforcing layer 12 and an outer layer 13 are formed in the order at the outer periphery of the rubber hose body 5, if desired. The reinforcing layer 12 and the outer layer 13 may be eliminated or piled up in layers.

An example (not shown in the drawings) of a rubber hose of such a composition may be formed as follows. A fixed width of a thin Mylar film 11 to one side of which an aluminum evaporation layer 9 and a hot-melt adhesive layer 10 are provided by adhesion in that order is longitudinally lapped around a mandrel with the hot-melt adhesive layer 10 outside to from a surface hard film 11. Then, a fiber tape 8 comprising a non-woven Tetoron fabric 6 and an adhesive layer 7 is spirally lapped on to the surface hard film 11 with the adhesive 7 inside. Next, an unvulcanized rubber comprising, for example, acrylonitrile-butadiene copolymer (NBR) or chloroprene rubber (CR) is formed by extrusion over the spirally lapped fiber tape 8 as a rubber hose body 5. Since the non-woven Tetoron fabric 6 is laminated by the adhesive 7 at a side, and actually holes 14 formed in the non-woven fabric 6 are filled with the adhesive 7, the process of covering the fiber tape 8 with the unvulcanized rubber is not liable to cause generation of "hold air", i.e., hold of air passed through the holes 14, between the non-woven fabric 6 and the surface hard film comprising Mylar film. In addition, since deformation of the non-woven fabric 6 in the diametric direction is perfectly eliminated at the time of extrusion of unvulcanized rubber on to the thin non-woven fabric 6, disturbance of the circular or cylindrical form is not liable to occur. Then, a fiber-reinforcing layer 12 comprising, for example, vinylon or nylon, and an outer unvulcanized rubber layer 13 comprising, for example, chlorosulfonated polyethylene (CSM), chloroprene rubber (CR), acryl rubber (ACM), hydrine rubber, or ethylene/propylene terpolymer (EPT) are formed on the rubber hose body 5 before vulcanization at heating, and the production of a rubber hose is completed. Since the hot-melt adhesives 7 and 10 in each layer are molten by heat at vulcanization, the lapped section in the Mylar film 11, the lapped section in the fiber tape 8, and the Mylar film 11 and the fiber tape 8 adhere perfectly. Thus, the Mylar film 11 and the fiber tape 8 are formed in a cylindrical shape, respectively. In addition, since generation of "hold air" through the holes 14 does not occur between the surface hard film 11 and the fiber tape 8 at extrusion of the unvulcanzed rubber hose body 5 on the fiber tape 8, surface roughness due to expanded air of the hard film 11 does not occur. Since the fiber tape 8 comprises the non-woven fabric 6 at the outer side, the non-woven fabric 6 is closely formed in a body with the rubber hose body 5 by the anchor effect at vulcanization.

Then, the surface hard film 11 at the inner periphery of the rubber hose body produced by such a process is cracked and bent repeatedly to observe the conditions of cracking. The conditions of cracking did not change with the repetition of bending. Also, cracking was not found in the rubber hose body 5, when the fiber tape 8 at the crack section was removed. Thus, the so-called joint cracking did not occur completely. Because of the characteristic features of the hard surface film 11 such as good sour gasoline resistance, good fuel permeation resistance, and good gas hole resistance, the rubber hose of this invention may solve some problems which have not been solved with conventional rubber hoses when used in car fuel hoses. In addition, the original flexibility of rubber is not spoiled, and the rubber does not cause swelling with fuels and the others, because the film positions at the most inner layer. The rubber hose of this invention may be used in not only fuel hoses but also all the range that conventional rubber hoses and plastic hoses are used in. The rubber hose of this invention bring the desired effects even when used in such a hose having a pipe diameter greater than its whole length.

Various considerations on conventional Freon hoses including an increase in thickness, use of higher nitrile NBR, balancing of cold resistance and flexibility which have been taken because of the large Freon permeation of conventional rubber hoses are not required with the rubber hose of this invention. It may also be practicable as a Freon hose for transporting refrigerants such as Freon R-22 although the conventional rubber hoses cannot be used because of large Freon permeation.

FIG. 5 is a modification of FIG. 2, wherein a surface hard film 15 consists of a Mylar film (12μ thick) on to which a polyethylene film (30μ thick) is laminated as a hot-melt adhesive, the said Mylar film 15 being put together at both ends sections in the longitudinal direction with the polyethylene film inside so that the polyethylene film as the most inner layer may cause melt-adhesion mutually, and the end sections 16 being bent longitudinally along the outer periphery of the Mylar film 15. If a nipper of a hose fitting (not shown in the drawings) is slidingly fixed to the said rubber hose at the end, damage of the Mylar film 15 itself is eliminated by natural diametric expansion of the rubber hose due to partial peeling at the both end sections 16. This effect is particularly marked when a film of small elongation is used as the surface hard film 15.

In FIG. 2 and FIG. 5, the surface hard films 11 and 15 are longitudinally lapped so as to cause to flow a fluid smoothly in any direction. However, they may be formed in spiral lapping, and the fiber layer 8 may be formed in longitudinal lapping.

The surface hard films 11 and 15 are provided at the inner periphery of the rubber hose body 5 in FIG. 2 and FIG. 5, however, they may be provided at the outer periphery of the rubber hose body 5.

Figure 6:
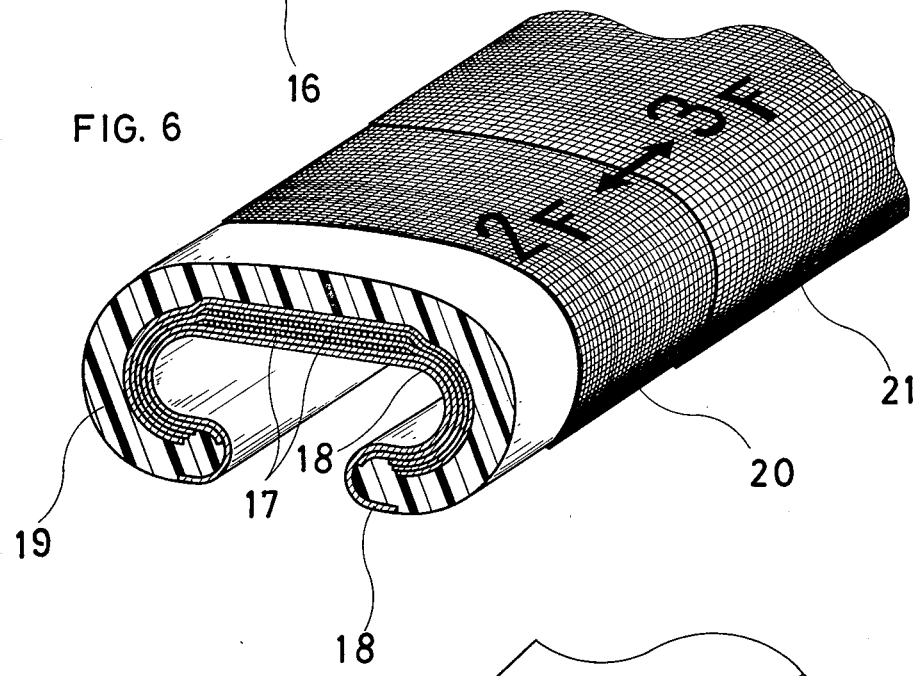

FIG. 6 is a handrail for use in escalators and automatic lines embodying the invention. A rubber handrail body 19 consists of, for example, styrenebutadiene rubber (SBR) which is formed in a body with a rubber-topped cotton canvas 18 (5 plies) having therein two layers of tension members 17 comprising metal wires or synthetic fibers. An embellished fiber layer 20 comprising a Tetoron fabric which is dyed or on which patterns, characters and symbols are printed is laminated on the outer periphery of the rubber handrail body 19 by use of a hot-melt adhesive agent. Furthermore, a surface hard film 21 comprising a thin and transparent Mylar film is laminated on the outer periphery of the fiber layer 20.

The Mylar film 21 in the handrail body 19 is cracked and bent repeatedly in a manner similar to that in FIG. 2 and FIG. 5 to observe the conditions of cracking in the handrail body. No "joint cracking phenomenon" was observed. Therefore, the surface of the handrail may be washed positively by a brush using a detergent. In addition, since the embellished surface (embellished fiber layer 20) is protected by the Mylar film 21, the degree of beauty is semipermanently maintained, and various drawbacks of conventional handrails including contamination of decorative rubber with dirt from the hands, loss of gloss or softening due to immersion of solvents are overcome, and use of strong detergents such as car wax is made possible.

The structure of handrails should not be limited to the structure as shown in FIG. 6. For example, those rubber handrail bodies containing only a layer of cotton canvas or embedding therein only a tension body are also practicable.

Figure 7:
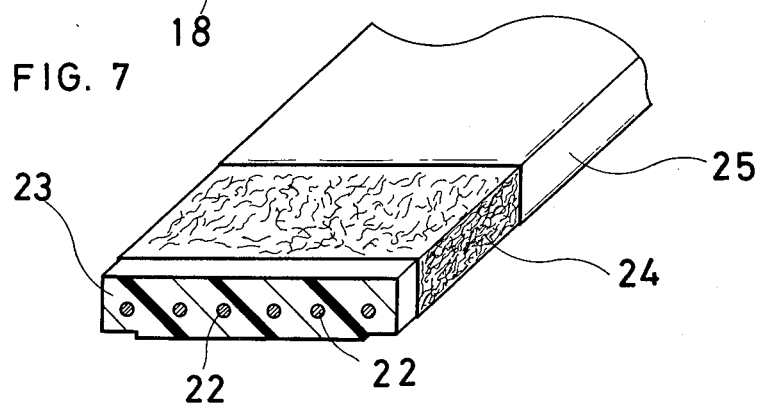

FIG. 7 is a rubber belt embodying the invention. The rubber belt body 23 consists of, for example, plastic elastomers, natural rubber (NR) or butyl rubber (IIR) and has several pieces of tension members 22 embedded therein.

A fiber layer 24 comprising a non-Woven Tetoron fabric, and a surface hard film 25 comprising a Mylar film are laminated by adhesion in the order on to the surface of the rubber belt body 23.

Experiments were carried out with the belt of such a composition in a manner similar to those with the abovementioned rubber hose and handrail.

No "joint cracking phenomenon" was observed. Therefore, surface cleaning may be positively carried out in the same manner as in the handrail. The rubber belt of such a composition may effectively be used as a belt for conveying meat, fishes and shellfishes in the food industry and the medical industry, and as a power-transmitting belt by making the best use of the characteristic features of the hard surface film.

In the above embodiments, the surface hard films 11, 15, 21 and 25 were formed at the inner periphery or the outer surface alone. However, the surface hard films may be provided over the whole surface, if required. In the above embodiments the films 11, 15, 21 and 25 were caused to adhere in a tape form on to the fiber layers 8, 20 and 24, respectively. However, the surface hard film may be formed on the fiber layers 8, 20 and 24 by spray coating, etc.

As in the embodiment of the handrail, embellished fiber layers may also be formed in the embodiments of the rubber hoses and belts.

The embodiments concerned with the hoses, handrails and belts, but this invention may also be used in producing a diaphragm. Furthermore, the applications of the invention should not be limited to the above embodiments.

As described above, the flexible articles having hard films of this invention eliminate "joint cracking phenomenon" by interposition of the fiber layers between the rubberlike bodies and the hard films formed at the surface thereof. Therefore, this invention may be applied in various flexible articles by making the best use of the characteristic features of the surface hard films formed at the surface of the rubberlike bodies.

What we claim is:

1. A flexible article which comprises a soft and flexible rubberlike body having a thickness; and a hard, stiff and thin surface film arranged over said flexible rubberlike body, said surface film being thin in comparison to the thickness of said flexible rubberlike body and comprising a plastic film or a film containing a complex of plastic and metal,
the improvement wherein a fiber layer comprising non-woven or woven fabrics is provided by adhesion at the interface between said surface film and said flexible rubberlike body.

2. The flexible article as claimed in claim 1, wherein the surface film has a thickness of 5–300μ.

3. The flexible article as claimed in claim 1, wherein the surface film has a Young's modulus at least 10 times greater than that of the rubberlike body.

4. The flexible article as claimed in any one of claims 1 to 3, wherein the rubberlike body is in the form of a hose.

5. The flexible article as claimed in claim 4, wherein the surface film is formed at the inner periphery of the hose.

6. The flexible article as claimed in claim 5, wherein the surface film is in the form of a tape, said tape being spirally lapped or arranged longitudinally with a lapped section over said fiber layer on said rubberlike body.

7. The flexible article as claimed in claim 6, wherein the surface film is arranged longitudinally over said fiber layer, said fiber layer comprising a fiber tape of non-woven or woven fabrics, said fiber tape having an adhesive agent on a side thereof in contact with said surface film.

8. The flexible article as claimed in claim 5, wherein the surface film is formed by coating.

9. The flexible article as claimed in any one of claims 1 to 3, wherein the rubberlike body is in the form of a handrail for use in escalators or automatic lines.

10. The flexible article as claimed in claim 9, wherein the surface film is formed at the outer surface of said handrail.

11. The flexible article as claimed in claim 9, wherein the surface film is a transparent plastic film, and the fiber layer is an embellished one.

12. The flexible article as claimed in any one of claims 1 to 3, wherein the rubberlike body is in the form of a belt for use in a power transmission or an article transport.

13. The flexible article as claimed in claim 12, wherein the surface film is a transparent plastic film, and the fiber layer is an embellished one.

14. The flexible article as claimed in claim 1 wherein the surface hard film has a thickness of 5–300$\mu$ and a Young's modulus at least 10 times greater than that of the rubberlike body.

15. The flexible article as claimed in claim 1, wherein said surface film is substantially thinner than said rubberlike body.

16. The flexible article as claimed in claim 4, wherein the surface film is a transparent plastic film, and the fiber layer is an embellished one.

17. A flexible article which comprises a soft and flexible rubberlike body having a thickness; and a hard, stiff and thin surface film arranged over said flexible rubberlike body, said surface film being thin in comparison to the thickness of said flexible rubberlike body and comprising a plastic film or a film containing a complex of plastic and metal, the improvement wherein a fiber tape comprising non-woven or woven fabrics and having an adhesive agent on a side thereof is arranged at the interface between said surface film and said flexible rubberlike body with the adhesive side facing surface film.

18. The flexible article as claimed in claim 17 wherein the surface hard film has a thickness of 5–300$\mu$ and a Young's modulus at least 10 times greater than that of the rubberlike body.

19. The flexible article as claimed in claim 17, wherein the rubberlike body is in the form of a hose, said surface film comprising a tape made of a plastic film which is lapped in the longitudinal direction about said fiber layer, said fiber tape being spirally lapped about said rubber-like body.

20. The flexible article as claimed in claim 17, wherein the rubberlike body is in the form of a handrail for use in escalators and automatic lines, or a belt for use in a power transmission and an article transport.

21. A flexible article which comprises a soft and flexible rubberlike body having a thickness; and a hard, stiff, thin and transparent surface film arranged over said flexible rubberlike body, said surface film being thin in comparison to the thickness of said flexible rubberlike body, the improvement wherein a fiber layer comprising embellished non-woven or woven fabrics is provided by adhesion at the interface between said surface film and said flexible rubberlike body.

22. The flexible article as claimed in claim 21 wherein the surface hard film has a thickness of 5–300$\mu$ and a Young's modulus at least 10 times greater than that of the rubberlike body.

23. A flexible article which comprises a soft and flexible rubberlike body having a thickness; and a hard, stiff, thin and transparent surface film arranged over said flexible rubberlike body, said surface film being thin in comparison to the thickness of said flexible rubberlike body, the improvement wherein a fiber tape comprising embellished non-woven or woven fabrics and having an adhesive agent on a side thereof is provided at the interface between the said surface film and said flexible rubberlike body, with the adhesive side facing said surface film.

24. The flexible article as claimed in claim 23 wherein the surface hard film has a thickness of 5–300$\mu$ and a Young's modulus at least 10 times greater than that of the rubberlike body.

* * * * *